US011212586B2

(12) United States Patent
Ko et al.

(10) Patent No.: US 11,212,586 B2
(45) Date of Patent: *Dec. 28, 2021

(54) EXTENDING PLAYING TIME OF A VIDEO PLAYING SESSION BY ADDING AN INCREMENT OF TIME TO THE VIDEO PLAYING SESSION AFTER INITIATION OF THE VIDEO PLAYING SESSION

(71) Applicant: Google LLC, Mountain View, CA (US)

(72) Inventors: Taeho Ko, San Francisco, CA (US); Robert Lee Thompson, San Francisco, CA (US); Leslie Wang, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,307

(22) Filed: Sep. 23, 2019

(65) Prior Publication Data

US 2020/0021889 A1 Jan. 16, 2020

Related U.S. Application Data

(63) Continuation of application No. 14/831,385, filed on Aug. 20, 2015, now Pat. No. 10,423,318, which is a (Continued)

(51) Int. Cl.
*H04N 5/445* (2011.01)
*H04N 21/472* (2011.01)
(Continued)

(52) U.S. Cl.
CPC ..... *H04N 21/47217* (2013.01); *G06F 3/0482* (2013.01); *G06F 3/04842* (2013.01);
(Continued)

(58) Field of Classification Search
CPC ....... H04N 21/47217; H04N 21/44204; H04N 21/47214; H04N 21/4882;
(Continued)

(56) References Cited

U.S. PATENT DOCUMENTS

| | | | |
|---|---|---|---|
| 6,782,550 B1 * | 8/2004 | Cao .................. | H04N 21/25808 725/39 |
| 8,006,262 B2 * | 8/2011 | Rodriguez ....... | H04N 21/23617 725/37 |

(Continued)

OTHER PUBLICATIONS

Notice of Allowance dated May 13, 2019 in U.S. Appl. No. 14/831,385.

(Continued)

*Primary Examiner* — Jefferey F Harold
*Assistant Examiner* — Sahar Aqil Riaz
(74) *Attorney, Agent, or Firm* — Byrne Poh LLP

(57) ABSTRACT

A device is disclosed that includes an interface component configured to generate a user interface for playing and requesting videos and a reception component configured to receive a subset of videos from a set of videos in accordance with a video streaming session having a preset duration of time and play the subset of videos for the preset duration of time via the user interface. The device further includes a request component configured to request an increase to the preset duration of time of the video streaming session by a segment of time after reception of a video included in the subset of videos, wherein in response to the request, the reception component is configured to receive the subset of videos for an amount of time including the preset duration of time plus the segment of time and play the subset of videos for the amount of time.

18 Claims, 12 Drawing Sheets

Related U.S. Application Data continuation of application No. 14/031,753, filed on Sep. 19, 2013, now Pat. No. 9,148,702.

(51) Int. Cl.
| | | |
|---|---|---|
| *G06F 3/0482* | (2013.01) | |
| *G06F 3/0484* | (2013.01) | |
| *H04L 29/06* | (2006.01) | |
| *H04N 21/442* | (2011.01) | |
| *H04N 21/262* | (2011.01) | |
| *H04N 21/488* | (2011.01) | |

(52) U.S. Cl.
CPC .......... *G06F 3/04847* (2013.01); *H04L 65/60* (2013.01); *H04N 21/44204* (2013.01); *H04N 21/47214* (2013.01); *H04N 21/26258* (2013.01); *H04N 21/4882* (2013.01)

(58) Field of Classification Search
CPC ............ H04N 21/26258; G06F 3/0482; G06F 3/04842; G06F 3/04847; H04L 65/60
USPC ...................... 725/38, 41; 715/722
See application file for complete search history.

(56) References Cited

U.S. PATENT DOCUMENTS

| | | | |
|---|---|---|---|
| 2002/0138826 A1 | 9/2002 | Peterka | |
| 2003/0001978 A1* | 1/2003 | Smith | ................ H04N 21/4331 348/714 |
| 2003/0005453 A1* | 1/2003 | Rodriguez | ......... H04N 21/4334 725/87 |
| 2003/0093803 A1 | 5/2003 | Ishikawa et al. | |
| 2003/0159142 A1* | 8/2003 | Howe | .............. H04N 21/44222 725/38 |
| 2004/0139024 A1 | 7/2004 | So | |
| 2005/0071886 A1* | 3/2005 | Deshpande | ...... H04N 21/47202 725/135 |
| 2008/0034396 A1 | 2/2008 | Lev | |
| 2009/0327100 A1* | 12/2009 | Greenberg | .............. G06F 16/70 705/26.1 |
| 2010/0228418 A1 | 9/2010 | Whitlow et al. | |
| 2011/0126246 A1* | 5/2011 | Thomas | ................... H04N 5/76 725/93 |
| 2011/0161997 A1 | 6/2011 | Rourk | |
| 2012/0051436 A1 | 3/2012 | Chen | |
| 2013/0204664 A1 | 8/2013 | Romagnolo et al. | |
| 2013/0317919 A1* | 11/2013 | Raman | ................... H04L 65/60 705/14.73 |
| 2014/0270704 A1 | 9/2014 | Zaveri | |
| 2014/0329548 A1 | 11/2014 | Tharshanan et al. | |

OTHER PUBLICATIONS

Notice of Allowance dated Jul. 8, 2015 in U.S. Appl. No. 14/031,753.
Office Action dated Mar. 20, 2015 in U.S. Appl. No. 14/031,753.
Office Action dated Mar. 28, 2018 in U.S. Appl. No. 14/831,385.
Office Action dated Aug. 10, 2018 in U.S. Appl. No. 14/831,385.
Office Action dated Nov. 23, 2018 in U.S. Appl. No. 14/831,385.

\* cited by examiner

EXTENDING PLAYING TIME OF A VIDEO PLAYING SESSION BY ADDING AN INCREMENT OF TIME TO THE VIDEO PLAYING SESSION AFTER INITIATION OF THE VIDEO PLAYING SESSION

CROSS-REFERENCE TO RELATED APPLICATIONS

This application is a continuation of U.S. patent application Ser. No. 14/831,385, filed Aug. 20, 2015, which is a continuation of U.S. patent application Ser. No. 14/031,753, filed Sep. 19, 2013, each of which is incorporated by reference herein in its entirety.

TECHNICAL FIELD

This application generally relates to systems and methods for extending playing time of a video playing session by adding an increment of time to the video playing session after initiation of the video playing session.

BACKGROUND

The proliferation of available streaming video is increasing at exponential levels that will soon reach many millions if not billions of such viewable streaming content. Conventionally, broadcast media has been provided by television or cable channels that typically have been provided by a relatively small number of content providers. However, with the ubiquitous nature of media creation and publishing tools, individuals are able to become productive content creators. This has resulted in the exponential growth of available streaming video. Many of these user generated videos are relatively short in length (e.g., about 3 to 5 minutes). Accordingly, rather than watching a single video having a relatively long duration of time, a user may choose to watch multiple short videos. However, keeping a user engaged when presenting the user with a series of short videos as opposed to a single video having a relatively long duration, (e.g., a motion picture), can be difficult.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
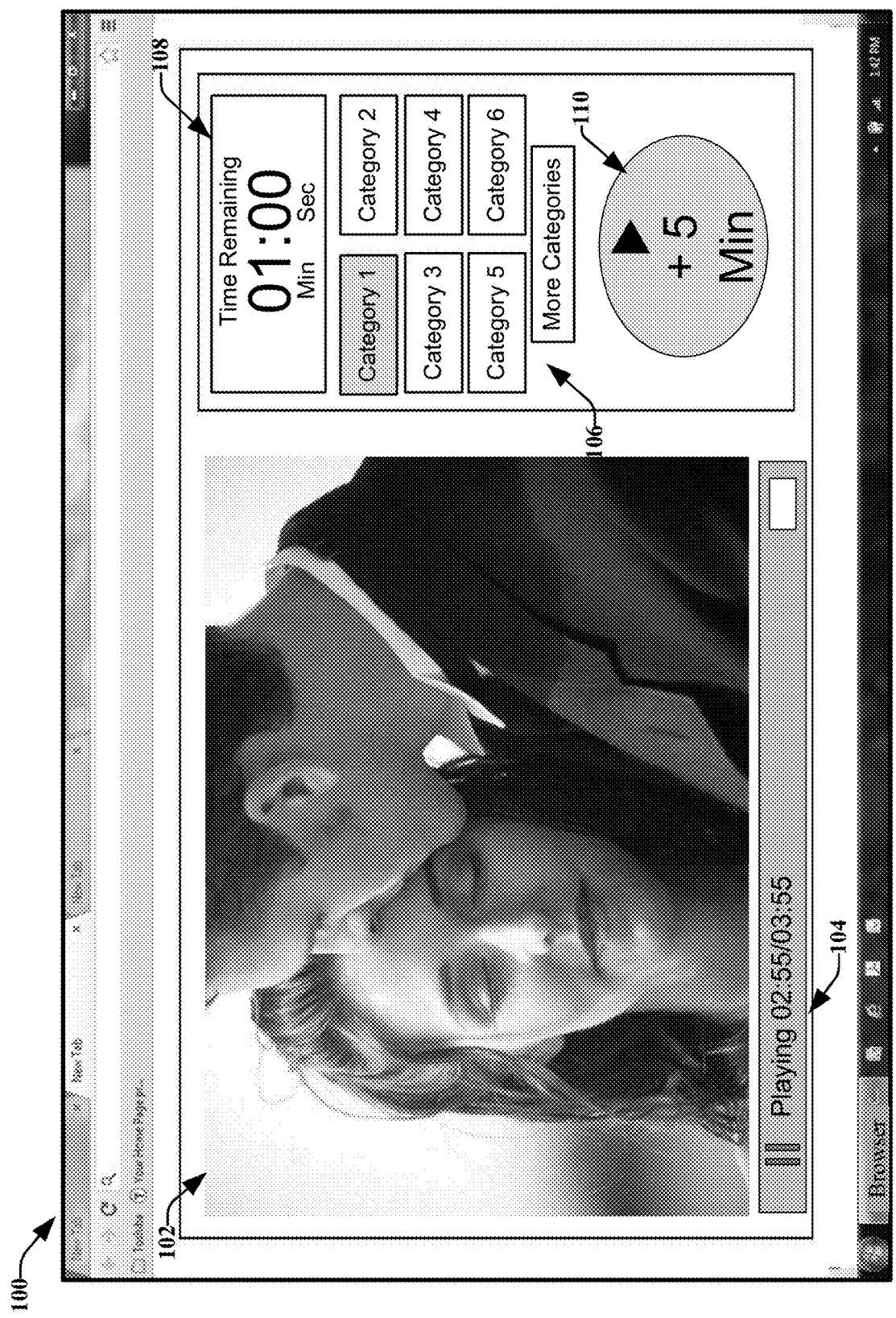
FIG. 1 presents an example user interface that facilitates extending playing time of a video playing session by allowing a user to add increments of time to the video playing session after initiation of the video playing session in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for extending playing time of a video playing/streaming session by adding increments of time to the video playing session after initiation of the video playing session. In an aspect, a user input feature (e.g. a soft button) for managing a watch timer in association with a media (e.g., video) streaming session is disclosed that allows a viewer of the media streaming session to increase time limit of the watch timer by a predetermined amount (e.g. five minutes), in real time. The media streaming session continues until the watch timer expires. The feature is particularly useful to a user that would liked to initially commit to a relatively short amount of time for watching videos yet is indecisive regarding exactly how much time the user would like to allocate to watching videos. Adding time to the watch timer on-the-fly extends duration of the watch timer in the event a user would like to extend a video viewing session beyond an amount of time initially committed to for the video viewing session. So, for example, a viewer of video can decide that he/she has some more time to continue to view video than he/she had previously anticipated when he/she started to view the video and can immediately increase duration of the watch timer by 5 minutes by simply pressing a soft button. The video is displayed until the watch timer expires. Similarly, when some or most of the newly added five minutes has elapsed, the user can increase viewing time by five more minutes by pressing the same soft button again.

In one or more aspects, a device is disclosed that includes an interface component configured to generate a user interface for playing and requesting videos and a reception component configured to receive a subset of videos from a set of videos in accordance with a video streaming session having a preset duration of time and play the subset of videos for the preset duration of time via the user interface. The device further includes a request component configured to request increase to the preset duration of time of the video streaming session by a segment of time after reception of a video included in the subset of videos, wherein in response to the request, the reception component is configured to receive the subset of videos for an amount of time including the preset duration of time plus the segment of time and play the subset of videos for the amount of time.

In another aspect, a system is provided that includes a video streaming component configured to initiate a video streaming session having a preset duration of time and stream a subset of videos from a set of videos to a device for playing at the device via a user interface generated at the device. The system further includes a video session control component configured to receive a request to increase the preset duration of time of the video streaming session by a segment of time after initiation of the video streaming session, wherein in response to the request, the video streaming component is configured to extend the duration of time of the video streaming session by the segment of time and stream the subset of videos for an amount of time including the preset duration of time plus the segment of time.

In yet another aspect, a method is disclosed that includes initiating a video streaming session having a preset duration of time, and streaming a subset of videos from a set of videos to a device for playing at the device via a user interface generated at the device. The method further includes receiving a request to increase the preset duration of time of the video streaming session by a segment of time after initiation of the video streaming session, in response to the request, extending the duration of time of the video streaming session by the segment of time, and streaming the subset of videos for an amount of time including the preset duration of time plus the segment of time.

Figure 2:
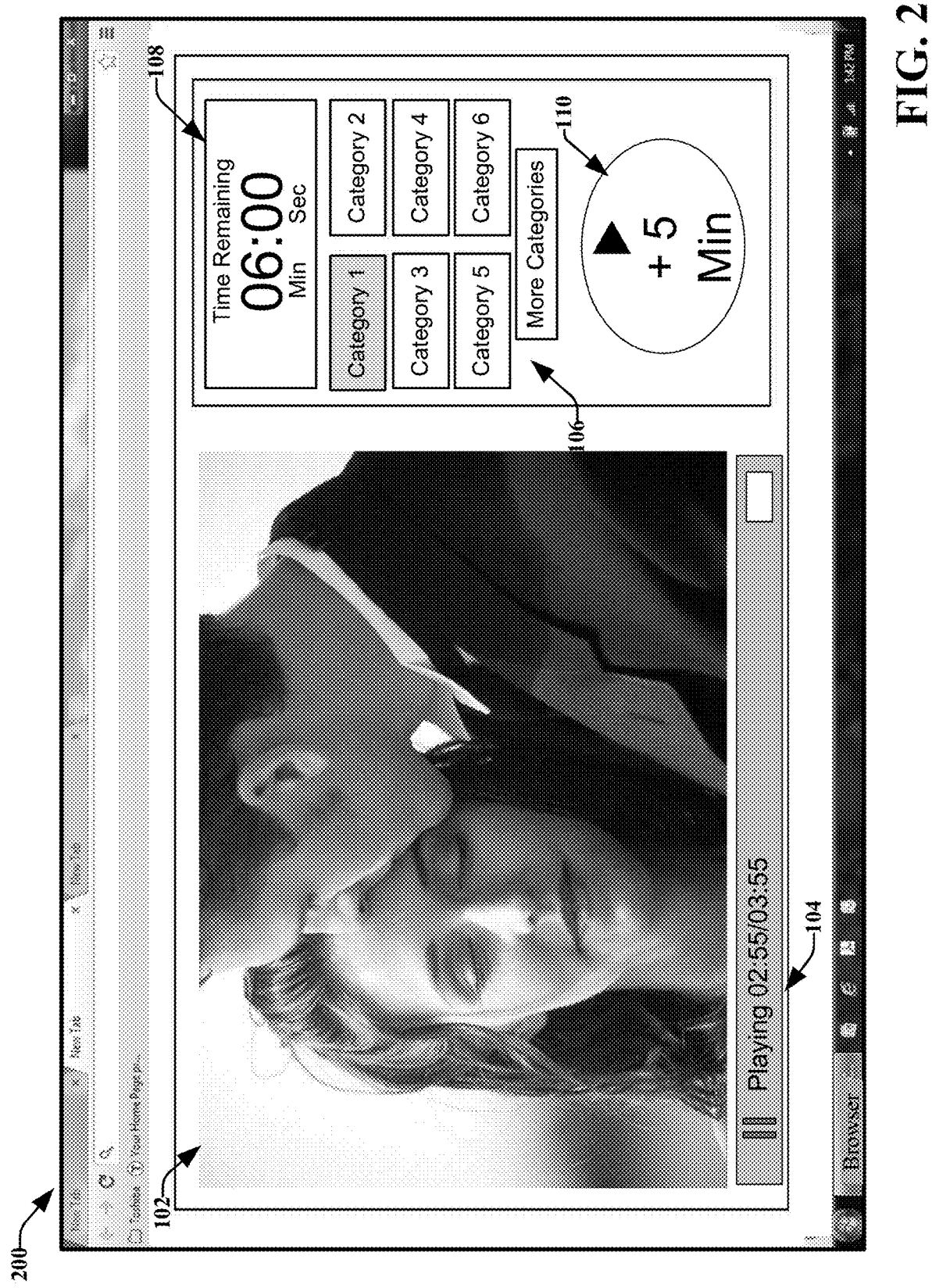
FIG. 2 presents another example user interface that facilitates extending playing time of a video playing session by allowing a user to add increments of time to the video playing session after initiation of the video playing session in accordance with various aspects and embodiments described herein.

Referring now to the drawings, with reference initially to FIGS. 1-2, presented are example user interfaces 100 and 200 that facilitate extending playing time of a video playing session by allowing a user to add increments of time to the video playing session after initiation of the video playing session in accordance with various aspects and embodiments described herein. In an aspect, interfaces 100 and 200 are generated by a computing device configured to at least receive and play streaming video from a networked media server. According to this aspect, interfaces 100 and 200 facilitate interaction with the networked media server in association with selecting videos for consuming, accessing the videos, and playing the videos. In another aspect, interface 100 is generated by a computing device configured to play videos provided locally at the computing device (e.g., in memory of the computing device or in data storage device operatively coupled to the computing device). According to this aspect, interfaces 100 and 200 facilitate accessing and playing videos provided locally at the computing device.

With reference to FIG. 1, interface 100 includes a primary viewing area in which videos are displayed and a toolbar 104 that allows a user to control the playing of the video (e.g., using traditional controls such as pause, play, fast forward, rewind, etc.). Toolbar 104 can also display a current playing time of the video with respect to the duration of the video. For example, interface 100 is exemplified in association with a video playing session currently playing a video at time point 02:55 of a video having a duration of 03:55. Interface 100 also includes a timer 108 that indicates an amount of time remaining in a current video playing session. As seen in example interface 100, the amount of time remaining in the video playing session is one minute.

A video playing session includes a user designated amount of time to view one or more videos from a set of videos in a continuous manner (e.g., one video being played after another without interaction with the video player by a user). In an aspect, a video playing session can be associated with a user designated amount of time to view a single video. According to this aspect, the video will stop playing until the video has completed or the duration of the video playing session runs out, whichever occurs first. In another aspect a video playing session can include a user designated amount of time in which the user would like to view a subset of videos from the set of videos. For example, a user can select a category of videos, (e.g., romance, comedy, sports, trending, recommended, etc.) and set up a video playing session that results in the playing of a subset of videos from the selected category. For example, interface 100 can include category menu 106 that displays a plurality of different categories (e.g., categories 1-6) of videos. Each category 1-6 can be associated with a set of videos belonging to the respective category. It should be appreciated that the headings Category 1, Category 2, etc., are merely employed for exemplary purposes and that category menu 106 can include more explicative headings.

As exemplified in interface 100, the user has selected Category 1 in association with the current video playing session. In another example, a user can select a playlist (not shown) that includes a plurality of videos in sequential order and set up a video playing session that results in the playing of a subset of videos from the playlist in a sequential order of the playlist or in a shuffle manner. According to these examples, the video playing session associated with a selected category or playlist results in the continuous playing of videos from the selected category or playlist, respectively, until the time allocated for the video playing session runs out. The number of videos that are played in a particular video playing session will depend on amount of time allocated for the video playing session and duration of the video or videos selected for playing during the video playing session. In an aspect, videos are selected for playing during a video playing session as a function of a user selected playlist, a user selected category, and/or a system that employs an algorithm to automatically select videos for playing in association with a video playing session on behalf of a user.

As noted above, with respect to example interface 100, a user has selected Category 1 in association with the current video playing session and the current video playing session has one minute remaining. In an aspect, Category 1 represents a set of short (e.g., 3-10 minutes) romance videos. By way of example, when the video playing session associated with interface 100 was initiated by the viewer, the viewer allocated 30 minutes for the video playing session. Thus during the previous 29 minutes of the video playing session, several short romance videos were played in a continuous manner. At time 1 minute remaining in the video streaming session, the video being played also has 1 minute remaining. As discussed infra, in an aspect, synchronization of the ending of a video in the video playing session with the allocated time duration for the video playing session (as it is in interface 100) is planned so that a video is not cut off before the ending of the video as a result in lapse of time in the video playing session. In another aspect, synchronization is merely a coincidence.

Interface 100 also includes a time adder feature 110 that allows a user to add more time to the video playing session at any point during the video playing session. The time adder feature 110 can be associated with a preset amount of time (e.g., five minutes) such that selection of the adder feature results in addition of the preset amount of time to the video session. In example interface 100, the user has selected the adder feature in order to add five more minutes to the video playing session.

FIG. 2 presents a resulting interface 200 in response to selection of the time adder feature 110 in interface 100. As seen in interface 200, the time remaining in the video playing session has increased by five minutes (e.g., from one minute left in interface 100 to six minutes left in interface 200). As a result, the video playing session will continue for six more minutes and one or more additional short romance videos will be played after the video currently being played has finished. In an aspect, the time adder feature 110 can be selected again and again to continue adding five more minutes to the video playing session (e.g., a user can select the adder feature three times to add fifteen more minutes to the video playing session).

Figure 3:
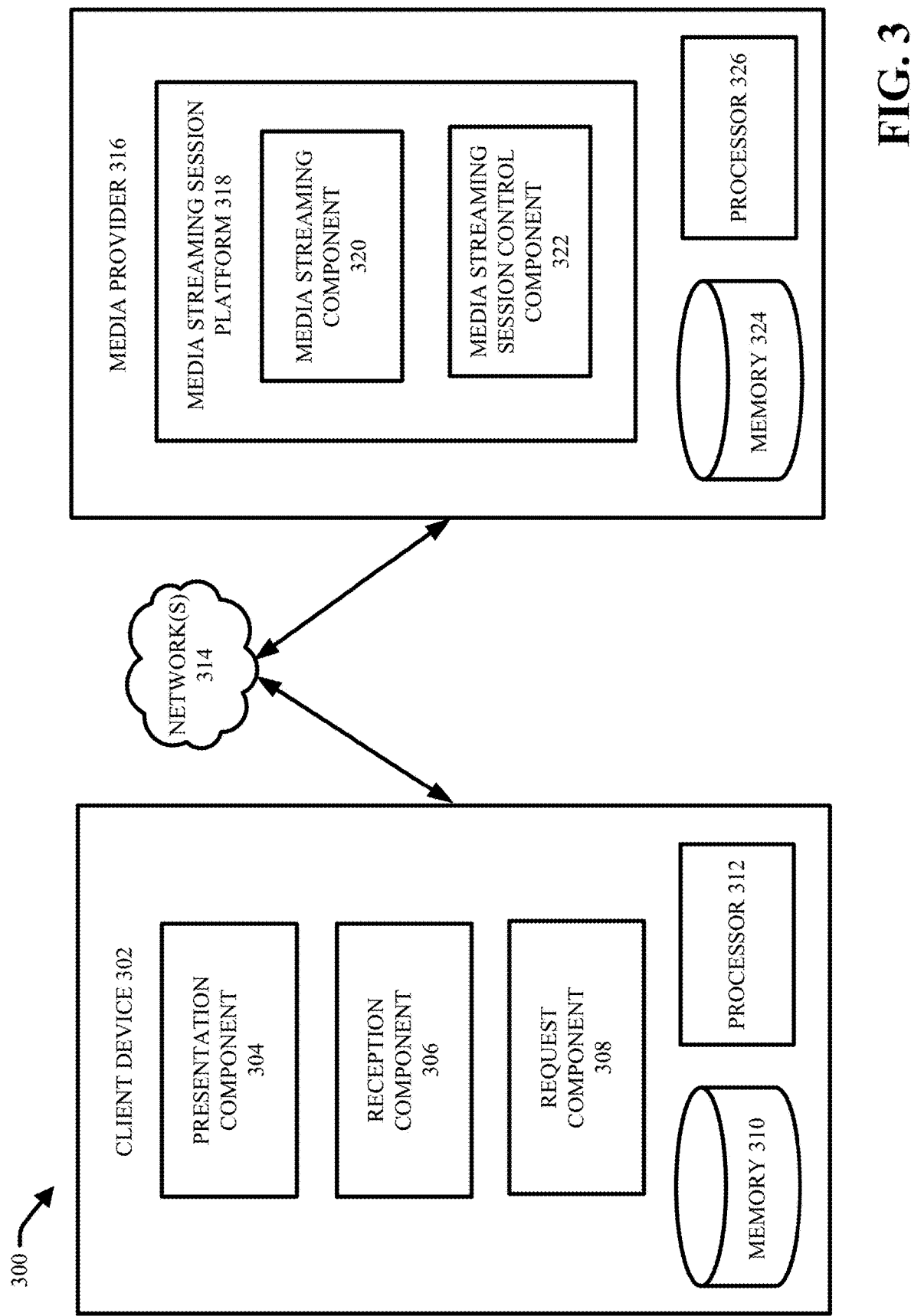
FIG. 3 illustrates an example system for extending playing time of a video playing session by allowing a user to add increments of time to the video playing session after initiation of the video playing session in accordance with various aspects and embodiments described herein.

With reference to FIG. 3 presented is diagram of an example system 300 for extending playing time of a video playing session by adding an increment of time to the video playing session after initiation of the video playing session in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 300 includes client device 302, media provider 316 and one or more networks 314 for connecting client device 302 and media provider 316 and for establishing a server/client relationship between media provider 316 and client device 302, respectively. Client device 302 can include memory 310 for storing computer executable components and instructions and processor 312 to facilitate operation of the instructions (e.g., computer executable components and instructions) by the client device 302.

Similarly, media provider 316 can include memory 324 for storing computer executable components and instructions and processor 326 to facilitate operation of the instructions (e.g., computer executable components and instructions) by the client device 302.

Media provider 316 can include an entity that provides media content to client device 302 via a network 314 (e.g., the Internet). For example, media provider 316 can provide and/or present media content to client device 302 via a website platform that can be accessed using a browser of the client device 302. The media content can be presented to a user of client device 302 in a window of a user interface generated/displayed by the browser of the client device 302. As used herein the term media content or media item can include but is not limited to streamable media (e.g., video, live video, streaming video, video advertisements, music, music videos, sound files and etc.) and static media (e.g., pictures, thumbnails). In some aspects, the term media content or media item includes a collection of media items such as a playlist including several videos or songs, or a channel including several videos or songs associated with a single media creator.

In an aspect, media provider 316 can employ one or more server computing devices to store and deliver streaming media content to users via a network 314. The media can be stored in memory 324 and/or at various servers employed by media provider 316 and accessed via client device 302 using a website platform of the media provider 316. For instance, media provider 316 can include a media presentation source that has access to a voluminous quantity (and potentially an inexhaustible number) of shared media (e.g., video and/or audio) files. In an aspect, the shared media files can include a voluminous quantity of relatively short video files (e.g., from about thirty seconds to about one hour) of various topics or categories which media provider 316 can organize into different sets of video files (e.g., romance, comedy, sports, trending, recommended, etc.). Media provider 316 source can further stream these media files to client device 302 via a network 314 in accordance with a video playing/streaming session initiated by a user of the client device 302.

Client device 302 can include any suitable computing device associated with a user and configured to interact with media provider 316 to receive streaming media and play streaming media (e.g., using a media player). For example, client device 302 can include a desktop computer, a laptop computer, a television, a mobile phone, a tablet personal computer (PC), or a personal digital assistant PDA. As used in this disclosure, the terms "content consumer" or "user" refer to a person, entity, system, or combination thereof that employs system 300 (or additional systems described in this disclosure) using client device 302. Network(s) 314 can include wired and wireless networks, including but not limited to, a cellular network, a wide area network (WAD, e.g., the Internet), a local area network (LAN), or a personal area network (PAN). For example, client device 302 can communicate with media provider 316 (and vice versa) using virtually any desired wired or wireless technology, including, for example, cellular, WAN, wireless fidelity (Wi-Fi), Wi-Max, WLAN, and etc. In an aspect, one or more components of system 300 are configured to interact via disparate networks.

Client device 302 can include presentation component 304 to generate a user a graphical user interface or virtual user interface (e.g., interfaces 100 and 200) for interacting with media provider 316 via a network 314 to request and play videos. In particular, the interface can facilitate requesting a video playing/streaming session with a preset amount of time and playing videos in association with the video playing/streaming session at client device 302. In an aspect, presentation component 304 can include an application (e.g., a web browser) for retrieving, presenting and traversing information resources on the World Wide Web in association with generating an interface for interacting with media provider 316. For example, presentation component 304 can employ a web browser to generate a user interface that displays various web pages associated with a website platform of media provider 316 that facilitate accessing videos provided by media provider 316, requesting a video streaming session from media provider, and playing videos in association with the video streaming session.

In another aspect, presentation component 304 can generate a user interface that facilitates consuming local multimedia provided at client device 302. According to this aspect, presentation component 304 can generate a user interface that does not employ a browser to access media content provided by media provider 316 via a network 314. Such a user interface can simply facilitate accessing and playing multimedia on client device 302 (e.g., from a multimedia library stored at client device). For example, presentation component 304 can generate a user interface that allows a user to request a media playing session using local a multimedia source, view the media playing session (e.g., via a media player), and control the media playing session.

Presentation component 304 can present media viewing options for use with any suitable type of device configured to interface play media and/or receive and play streamed media from media provider 316, including but not limited to: a mobile phone, a tablet computer, a desktop computer, a server system, a personal computer, a cable set top box, a satellite set top box, a cable modem, a television set, an internet-enabled television, a television computer device media extender device, a video cassette recorder device, a blu-ray device, DVD(digital versatile disc or digital video disc) device, a compact disc device, a video game system, an audio/video receiver, a radio device, a portable music player, a navigation system, a car stereo, etc.

The respective devices listed above (and additional devices suitable for interfacing with a streaming media provider) often have different capabilities and limitations (e.g., screen size, decoders . . . ). In an aspect, presentation component 304 can provide presentation options in accordance with different device capabilities or limitations. For example, data rendering capabilities may be more limited in a mobile device (e.g., a smart-phone) than in a fixed computing device (e.g., a desktop computer), more effort may be required of a user to consume content such as a video (or other information) from the mobile device than would be required of the user in viewing the same video from a fixed computing device. In addition, because displays of various mobile devices are often smaller than displays in fixed computing devices, it may be possible only to display a relatively small amount of information at any given time on a mobile device. Finally, data connections between a mobile device and various networked resources (e.g., the Internet) may be slower than corresponding data connections between a fixed computing device and the same networked resources. Accordingly, presentation component 304 can generate user options to account for variations in device functionality and available bandwidth for consumption and rendering of media content.

In view of the above, presentation component 304 can present content in various formats and/or in accordance with various display mediums. In particular, presentation component 304 can adapt and optimize display of options and content based on respective client devices. For example, presentation component 304 can adapt the manner in which a video recommended for re-watch is presented to a user (e.g., as an end-cap, as a pop up, in a recommendation section, etc.) based on client device 120 capabilities and display restrictions. In another example, presentation component 304 can present a section of video in a format such as H.263, H.264 AVC, MPEG-4 SP, VP8, or other suitable format based on the client device 120. In yet another example, presentation component 304 can present an audio of a video in formats such as for example AAC LC/LTP, HE-AACv1(AAC+), HE-AACv2 (enhanced AAC+), AMR-NB, AMR-WB, FLAC, MP3, MIDI, Vorbis, PCM/WAVE, etc.

In an aspect, presentation component 304 can automatically configure or present user options to consume video based on encoding parameters such as video resolution, video frame rate, video bit rate, video codec, audio codec, audio channels, audio bit rate, etc. Thus presentation component 304 can choose a format to consume content that best suits capabilities of specific consumption mediums, available bandwidth, file size, processing capabilities, screen resolution, screen size, available encoders, available decoders, etc.

Request component 308 is configured to request a media in association with a media playing session via an interface generated by presentation component 304. For example, request component 308 can request a media playing session from media provider 316 via a network 314. The request can define a preset duration of the requested media playing session and indicate a video or set of videos to include in the media playing session. For example, via a user interface generated by presentation component 304, a user can request a video streaming session for thirty minutes from a set of videos recommended by media provider 316. In another example, a user can request a video streaming session for an hour to include videos from a specific channel (e.g., a set of videos associated with a single video uploaded entity). In yet another example, a user can request a video streaming session for twenty minutes to include videos related to current events. In yet another example, a user can request a music playing session for two hours (e.g., using audio files and/or audio files associated with video files) to include songs from an 80s rock and roll genera. Request component 308 can configure and send these requests for media streaming/playing sessions to media provider 316. It should be appreciated that the type of video or audio as well as the duration of a media streaming session can vary and is not restricted to the time frames and examples provided herein.

Reception component 306 is configured to receive, via a network 314 and from media provider 316, media included in a media streaming session in accordance with the terms of the requested media streaming session. In response to reception of the streamed media, reception component 306 can effectuate the playing of the received media (e.g., using a media player) via an interface generated by presentation component 304 in accordance with terms of the requested media session (e.g., for the requested preset duration of the media streaming session). For example, reception component 306 can receive streaming video provided by media provider 316 in response to a request for a video streaming session.

Request component 308 is further configured to request modifications to a media streaming session. In particular, request component 308 can generate a request to add more time to a preset duration of a media streaming session after the initiation of the media streaming session. For example, using an interface generated by presentation component 304, (e.g., interfaces 100 and 200) a user can request to extend a preset duration of a video streaming session. In another example, using an interface generated by presentation component 304, a user can request to change the type of videos (e.g., from basketball videos to football videos) included in a video streaming session. Request component 308 can configure and send requests to modify media streaming to media provider 316 via a network. In response, to a request to modify a media streaming session, reception component 306 is configured to receive media associated with the media session in accordance with the modification defined in the request. For example, in response to a request to extend the preset duration of a media streaming session by five minutes, reception component 306 is configured to receive and play media associated with the media streaming session for five additional minutes.

Media provider 316 can include media streaming session platform 318 to facilitate conducting media streaming sessions with client device 302 in accordance with aspects described herein. Media streaming session platform 318 can include media streaming component 320 and media streaming session control component 322. Media streaming component 320 is configured to stream media to client device 302 in accordance with a request for a media streaming session. For example, media streaming component 320 can identify media (e.g., video files or music files) associated with a media streaming session request from client device 302 and stream the media to client device 302 in a continuous manner for the preset duration specified in the media streaming session request. Media streaming session control component 322 is configured to control a media streaming session between media provider 316 in association with parameters defined in the media streaming session request. In particular, media streaming session control component 322 is configured to monitor a duration of a media streaming session and stop the streaming (e.g., by media streaming component 320) of media included in the media streaming session in response to the preset duration of the media streaming session coming to an end. In addition, media streaming session control component 322 is configured to effectuate any changes requested to a media streaming session during the course of the media streaming session. For example, media streaming session control component 322 can add time to a preset duration of a media streaming session in response to a request.

Figure 4:
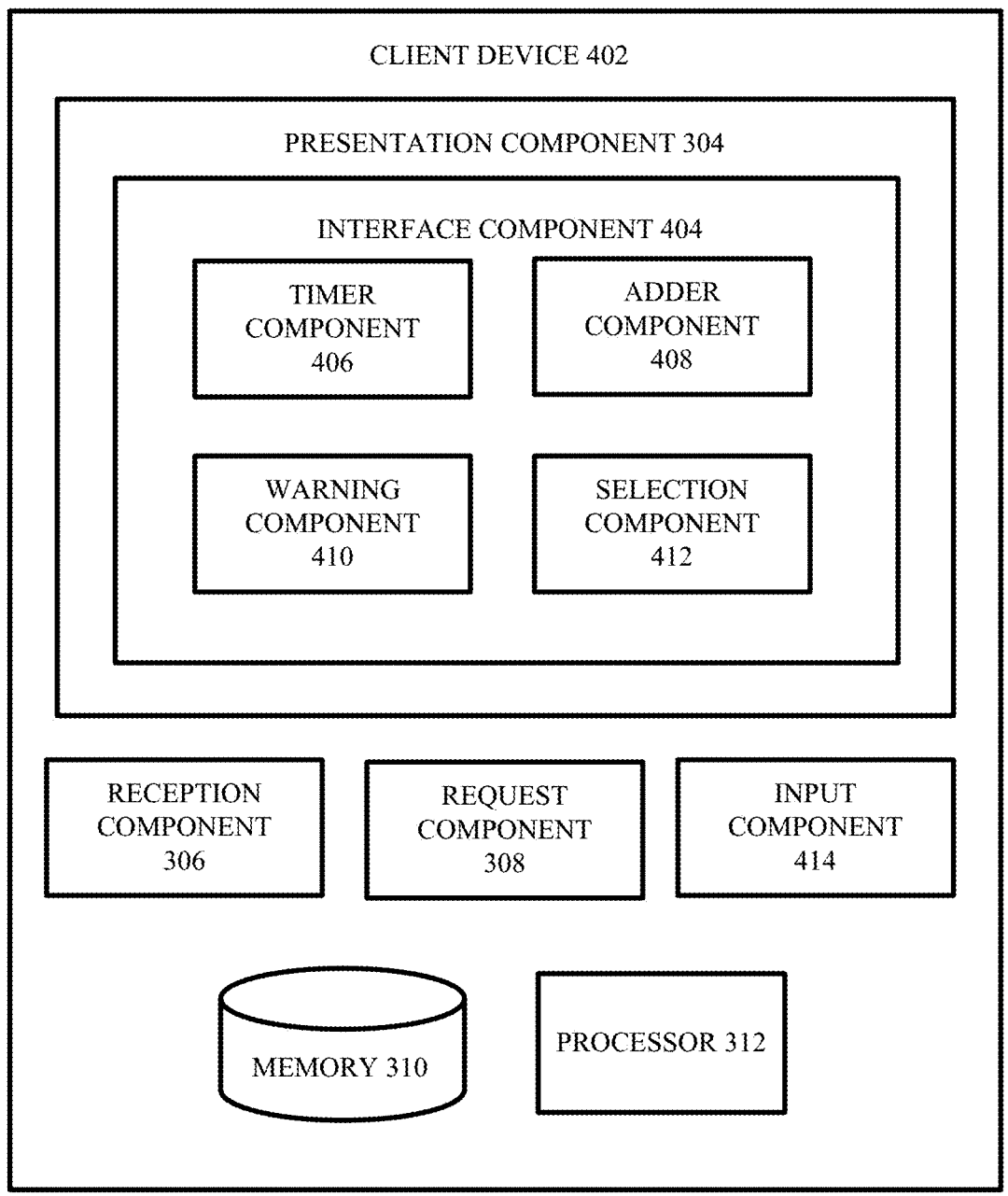
FIG. 4 illustrates an example user device that allows a user to establish a video streaming session with a preset time duration and add increments of time to the preset duration of the video playing session after initiation of the video playing session in accordance with various aspects and embodiments described herein.

FIG. 4 illustrates an example client device 402 that allows a user to establish a video streaming session with preset time duration and add increments of time to the preset duration of the video playing session after initiation of the video playing session in accordance with various aspects and embodiments described herein. Client device 402 can include same or similar features and functionalities of client device 302. Repetitive description of like elements employed in respective embodiments of systems and interfaces described herein are omitted for sake of brevity.

Presentation component 304 of client device 302 can include interface component 404 to generate a user interface (e.g., interfaces 100, 200 and the like) with features and functionalities that facilitate requesting a media playing/streaming session with a preset duration, viewing media in accordance with the media playing/streaming session and adding additional time to the media playing/streaming session after initiation of the media streaming session. The interface can include at least a primary display area that includes a media player for playing video and/or audio in accordance with a media streaming session. In addition to the media player, the interface can also include a timer (e.g., a watch timer/playing timer), a soft button that facilitate adding time to a video streaming session, and an input area that facilitates requesting a media streaming session with a preset duration and selecting media to include in a media streaming session.

Interface component 404 can include timer component 406 to generate and display a timer in a user interface that indicates an elapsed amount of time in a media streaming session or a remaining amount of time in a media streaming session duration in real time. For example, as seen in interfaces 100 and 200, a watch clock or timer 108 is displayed in an upper right corner of the respective interfaces that indicate an amount of time remaining in a current video playing session.

Adder component 408 is configured to generate an input mechanism at a user interface generated by interface component 404 that facilitate input of a request to increase a preset duration of time of a video streaming session by a segment of time. For example, as seen in interfaces 100 and 200, a time adder feature 110 can be generated by adder component 408 and displayed in a lower right hand corner of the respective interfaces that allows a user to add more time to a video playing session at any point during the video playing session. In an aspect, the adder feature can be associated with a preset amount of time such that selection of the adder feature results in addition of the preset amount of time to the video session. In an aspect, the preset amount of time is five minutes. In another aspect, the preset amount of time is between about three and about eight minutes. In yet another aspect, the preset amount of time is ten minutes. In an aspect, the adder feature can include an interactive soft button that can be selected one or more times to add the preset amount of time associated with the soft button to the amount of time remaining in a video playing session. For example, a soft button that can be selected once to add five minutes of time to a current video streaming session can be selected twice to add ten minutes, three times to add fifteen minutes, four times to add twenty minutes, etc. According to this aspect, the soft button can be selected any number N of times at any point during the playing of a video playing session.

In another aspect, adder component 408 can generate an input mechanism that allows a user to select a user configured amount of time to add to a video playing session (e.g., as opposed to a preset amount of time associated with a soft button). According to this aspect, adder component 408 can generate a dialogue box that allows a user to type in or otherwise input any amount of time which the user desires to add to a media playing session.

It should be appreciated that various mechanisms aside from a soft button or configurable dialogue box can be employed by adder component 408 to facilitate input of an amount of time to add to a media playing session after initiation of the media playing session and the subject disclosure is not intended to be limited by the examples described herein. For instance, adder component 408 can generate an overlay button on top of a video player in which a video is being played in association with a video streaming session that allows a user to add time to the video playing session. In another example, adder component 408 can generate a pop-up display that allows a user to add time to a video playing session prior to the ending of the video playing session.

Warning component 410 is configured to generate a warning prompt near the end of a duration of a media streaming session indicating that the media streaming session will end in X amount of time (where X is a number). For example, as a user is watching a video near the end of a video streaming session, warning component 410 can generate a pop-up display or dialogue box overlaid onto the video content indicating the amount of time remaining in the video streaming session. The warning can serve as a reminder to the viewer that the video streaming session will end in X amount of time unless the user chooses to add more time to the video streaming session. In an aspect, the warning message can suggest the user request an extension of the duration of the video streaming session. In another aspect, the warning message can indicate an amount of time to add to a video streaming session. For example, where a video streaming session is about to end during the middle of a video, warning component 410 can suggest the user add at least an amount of time to the video streaming session to finish the video.

Figure 5:
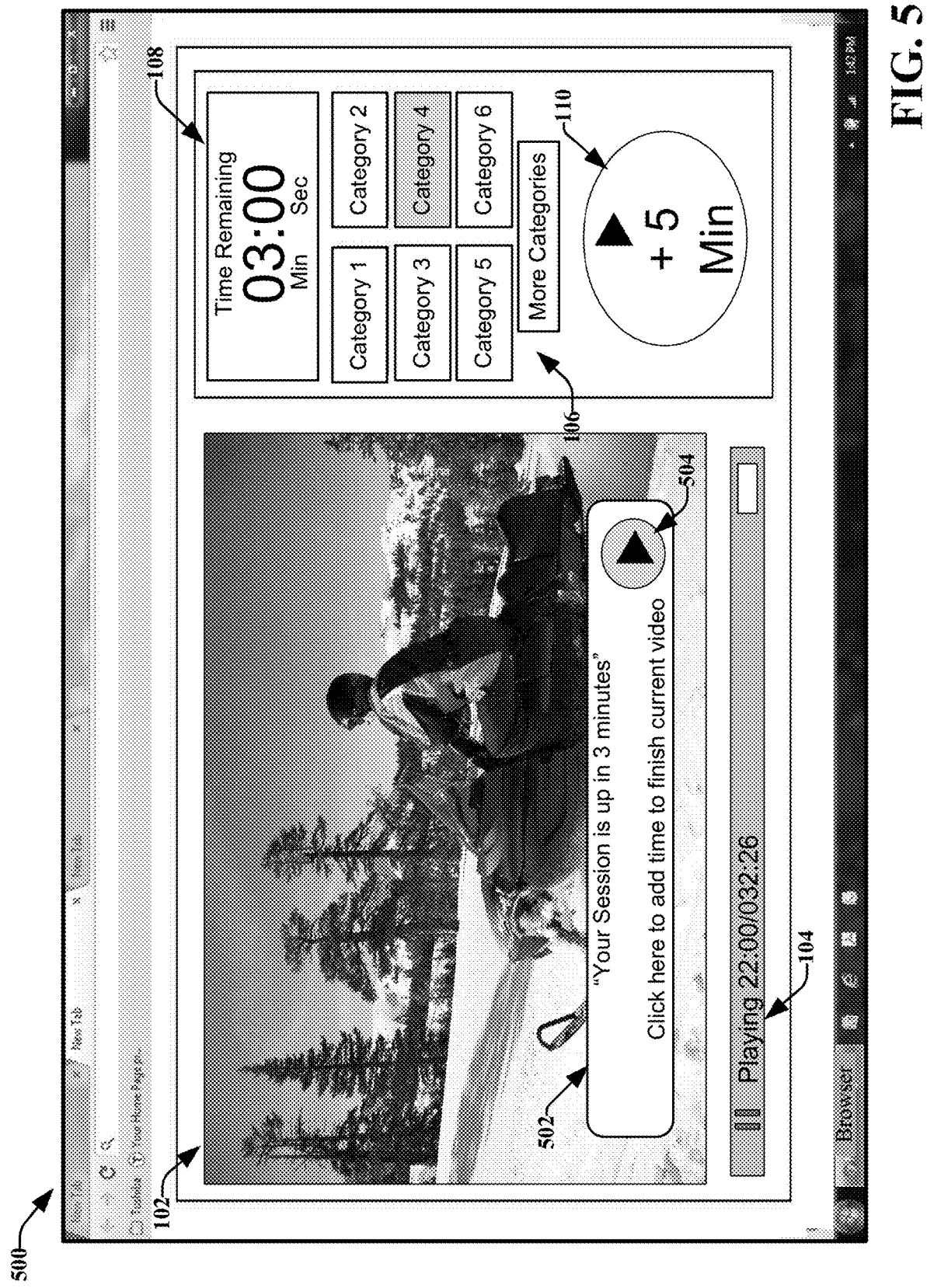
FIG. 5 presents another example user interface that facilitates extending playing time of a video playing session by allowing a user to add increments of time to the video playing session after initiation of the video playing session in accordance with various aspects and embodiments described herein.
Figure 6:
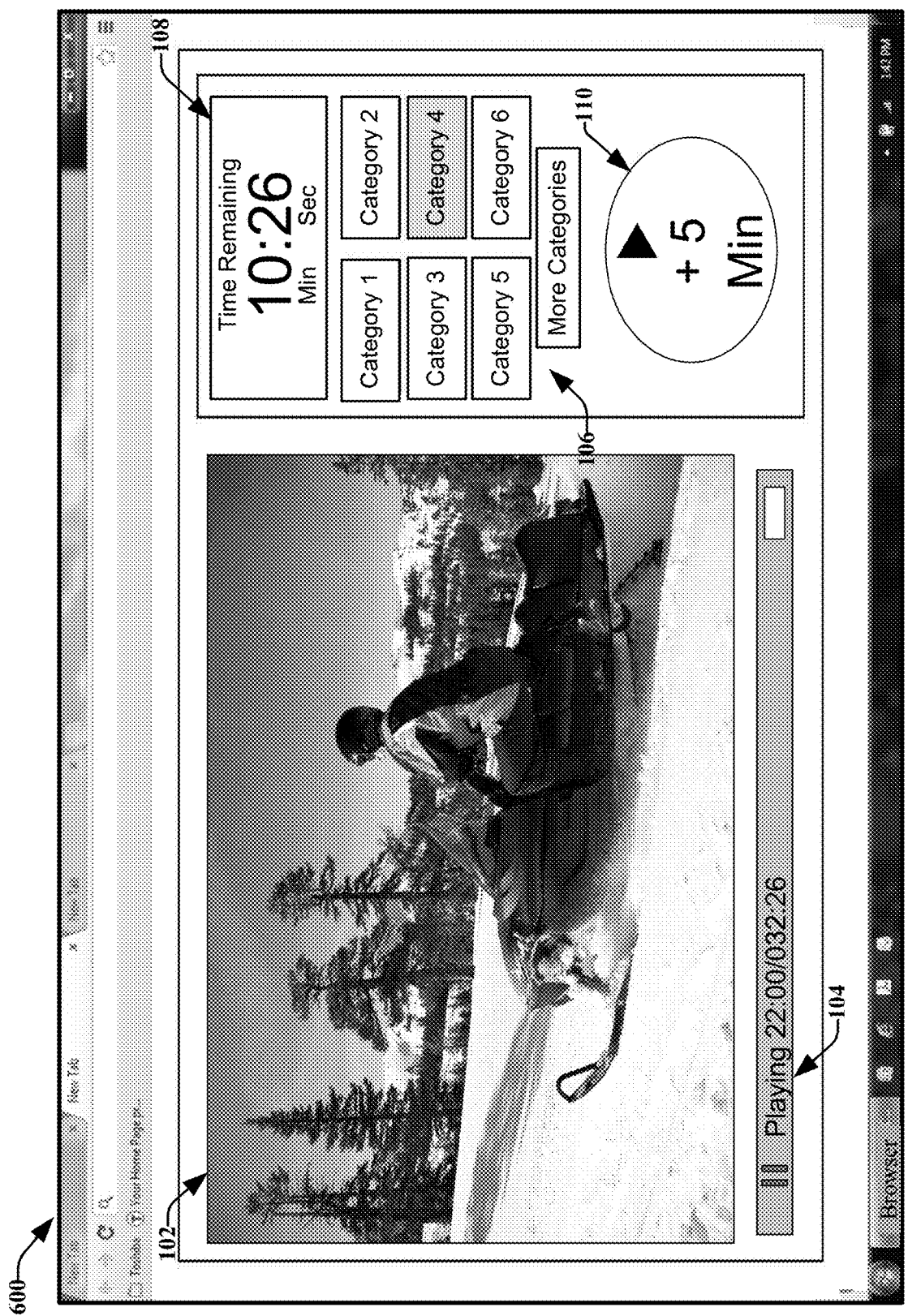
FIG. 6 presents another example user interface that facilitates extending playing time of a video playing session by allowing a user to add increments of time to the video playing session after initiation of the video playing session in accordance with various aspects and embodiments described herein.

For example, FIGS. 5-6 present example user interfaces 500 and 600, respectively, that demonstrate features associated with warning component 410. Interfaces 500 and 600 include same or similar features and functionalities as interfaces 100 and 200. Repetitive description of like elements employed in respective embodiments of systems and interfaces described herein are omitted for sake of brevity.

With reference to FIG. 5, interface 500 includes a warning message 502 that is configured as an overlay pop-up dialogue box. In this example, warning component 410 is configured to generate warning message 502 when the video streaming session has only three minutes remaining, as indicated by timer 108. Warning message 502 informs the viewer that the viewer's streaming media session will be up in three minutes. In addition, warning message 502 provides the viewer with an interactive prompt button 504 to select to add just enough more time to finish the video. According to this aspect, the viewer can select interactive prompt button 504 to just enough more time to finish the video or time adder feature 110 to add increments of five minutes to the video streaming session watch time.

FIG. 6 presents an example interface that is generated in response to interactive prompt button 504 in interface 500. In particular, as seen in interface 600, the watch time remaining indicated by timer 108 has increased by ten minutes and twenty six seconds (e.g., from three minutes remaining in interface 500 to thirteen minutes and twenty six seconds remaining in interface 600). The amount of time added, ten minutes and twenty six seconds, is exactly the amount of time remaining in the video (e.g., as indicated by the current playing point with respect to the video duration displayed in toolbar 104).

Referring back to FIG. 4, interface component 404 can also include selection component 412 to generate an input area/mechanism on an interface generated by interface component 404 that facilitates requesting a media playing/streaming session with a preset duration and selecting media to include in a media streaming session. For example, as seen in interfaces 100 and 200, a category menu 106 can be generated by selection component 412 on a right side of the respective interfaces that displays a plurality of different categories (e.g., categories 1-6) of videos. A user can select a category from the category menu in association with requesting a streaming video session to indicate that the user would like to view videos form the selected category during the video streaming session.

It should be appreciated that a category selection menu is merely an example mechanism that can be employed by selection component 412 to facilitate selection of media to include in a media streaming session. For example, in another aspect, selection component 412 can generate a text box that allows a user to type in information (e.g., keywords) indicating a type of media to include in a media streaming session. In another example, selection component 412 can allow a user to interact with an interface generated by interface component 404 and select a predefined playlist of sequentially ordered media items to draw from during a media streaming session. According to this aspect, reception component 306 can sequentially receive the media items for playing in accordance with the order of the media items in the playlist.

Client device 402 can include input component 414 to facilitate user interaction with interfaces generated on/by client device. Input component 414 can include an input device (e.g., a mouse, a touch screen, a speaker, a motion sensor, a proximity sensor, a gaze detection device, etc.) and/or software that analyzes data captured by the input device to determine an intention of the user with respect to interaction with a user interface generated by interface component 404 (e.g., select, move, add time to a video streaming session, etc.).

Figure 7:
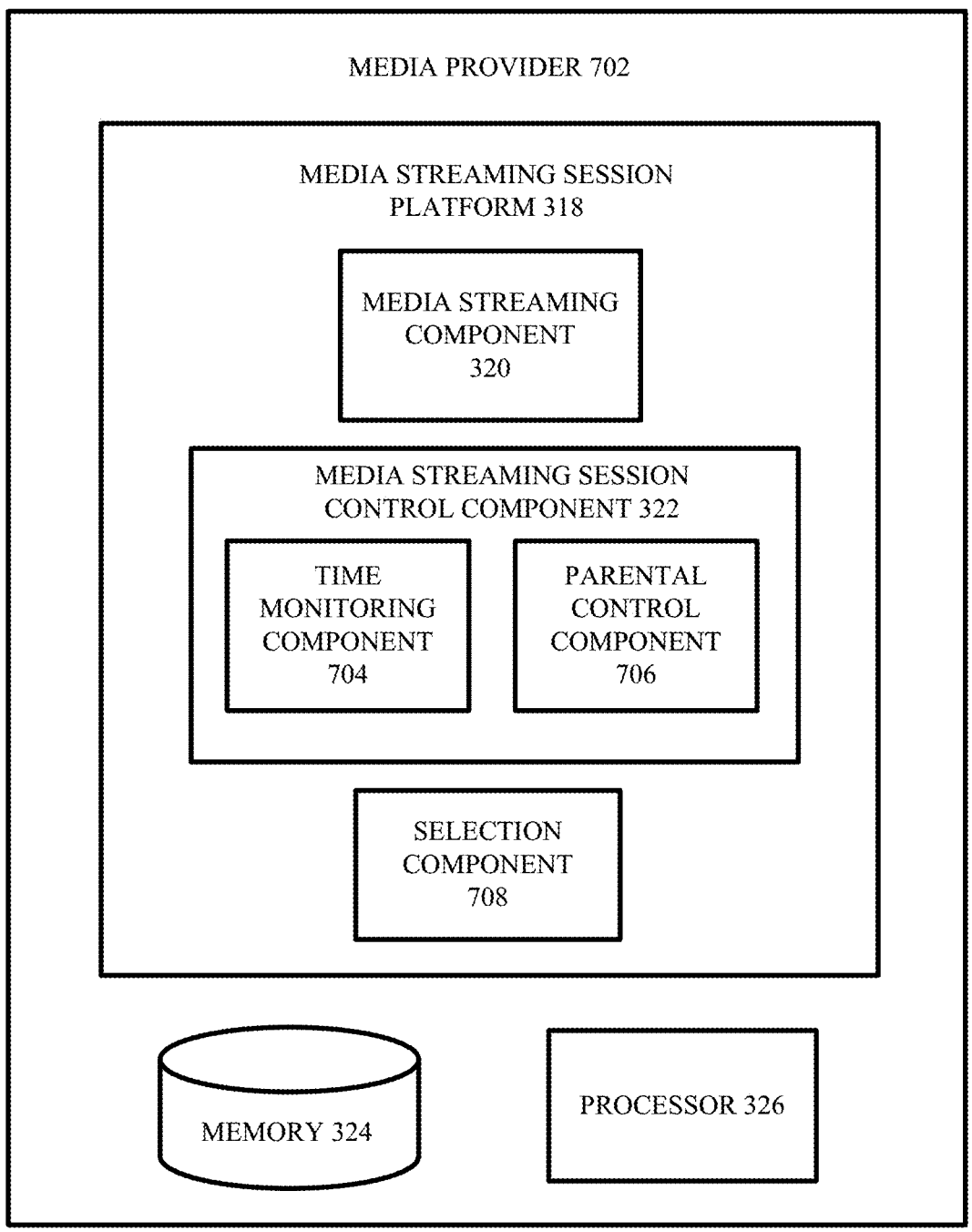
FIG. 7 illustrates an example media server that facilitates extending playing time of a video playing session by allowing a user to add increments of time to the video playing session after initiation of the video playing session in accordance with various aspects and embodiments described herein.

Turning now to FIG. 7 illustrated is an example media provider 702 that facilitates extending playing time of a video playing session by allowing a user to add increments of time to the video playing session after initiation of the video playing session in accordance with various aspects and embodiments described herein. Media provider 702 can include same or similar features and functionalities as media provider 316 with the addition of time monitoring component 704 and parental control component 706 to media streaming session control component 322. In addition, the media streaming session platform 318 of media provider 702 further includes selection component 708. Repetitive description of like elements employed in respective embodiments of systems and interfaces described herein are omitted for sake of brevity.

Media streaming session control component 322 can employ time monitoring component 704 to monitor paying time of videos provided to a client device during a media streaming session in real time. Accordingly, time monitoring component 704 can keep track of the duration of a video streaming session to determine when to stop streaming videos in accordance with a video streaming session at a point when duration of the video streaming session has reach completion.

Media streaming session control component 322 can employ parental control component 706 to enable a parent or other authority figure to impart restrictions regarding who can request additional time to be added to a media streaming session. For example, a parent may want to restrict the amount of time her child is allowed to watch streaming videos during a streaming video session and disable the ability for her child to merely add additional time to a video streaming session using the devices and interfaces described herein. Accordingly, in an aspect, parental control component 706 can associate a password, personal identification number, or other form of security setting with a user account that serves as a barrier against allowing a user associated with the account to increase a preset duration of a video streaming session after initiation of the video streaming session. For example, before a user has authority to increase time of a video streaming session after initiation of the video streaming session (e.g., using an adder feature generated by adder component 408), parental control component 706 can require the user to input a secret password.

Selection component 708 is configured to select videos for inclusion in a video streaming session based in part on a user request for the video streaming session. As noted infra, in an aspect, a user can select a media category type or a playlist from which to receive videos in association with a request for a video streaming session. According to this aspect, selection component 708 can employ various algorithms to select which videos to include from a particular media type category or playlist that can account for various factors including but not limited to: user preferences, user demographics, trending videos, user social circles, or user watch history. In an aspect, when a video streaming request indicates a predefined playlist, selection component 708 can start with the first video or song in the playlist and sequentially move through the media items in the playlist until the duration of time for the media streaming session lapses. In another aspect, when a video streaming request indicates a predefined playlist, selection component 708 select media items for streaming from the playlist in a shuffled or random order.

In an aspect, selection component 708 is configured to select media items for inclusion in a media streaming session based in part on a preset duration of time specified for the media streaming session. For example selection component 708 can select a subset of videos from a set of videos for streaming to a user during a video streaming session that have a cumulative duration of the preset duration of time. The set of videos can include a plurality of videos having varying durations of time. As a result, when the video streaming session reaches completion, the ending point of the final video being played will coincide with the ending point of the video streaming session. Thus a user will not experience a situation where a video is cut off in the middle based on a time limit of the video streaming session. Similarly, in response to a request to add more time to a video streaming session, selection component 708 can select one or more additional videos from the set of videos to stream to the user based on the amount of additional time requested such that the cumulative duration of the one or more additional videos coincides with the amount of time added. For example, if a user request five additional minutes to be added to a video streaming session, selection component 708 can select a first video having a duration of four minutes and a second video having a duration of one minute.

In another aspect, selection component 708 can select videos that are associated with a high level of user affinity (e.g., popular videos, videos users have provided positive reviews on, videos most user tend to re-watch, etc.) to provide as the last video in a video streaming session to entice users to add more time to their video streaming session. According this aspect, as a tactic to entice users to add more time to continue a video streaming session, selection component 708 can purposely stream a popular video as the last video in a video streaming session such that the video streaming session duration will end prior to the completion of the popular video. As a result, user's will be inclined to add more time to their video viewing session to finish the video that has kept them on the edge of their seat so to speak.

Figure 8:
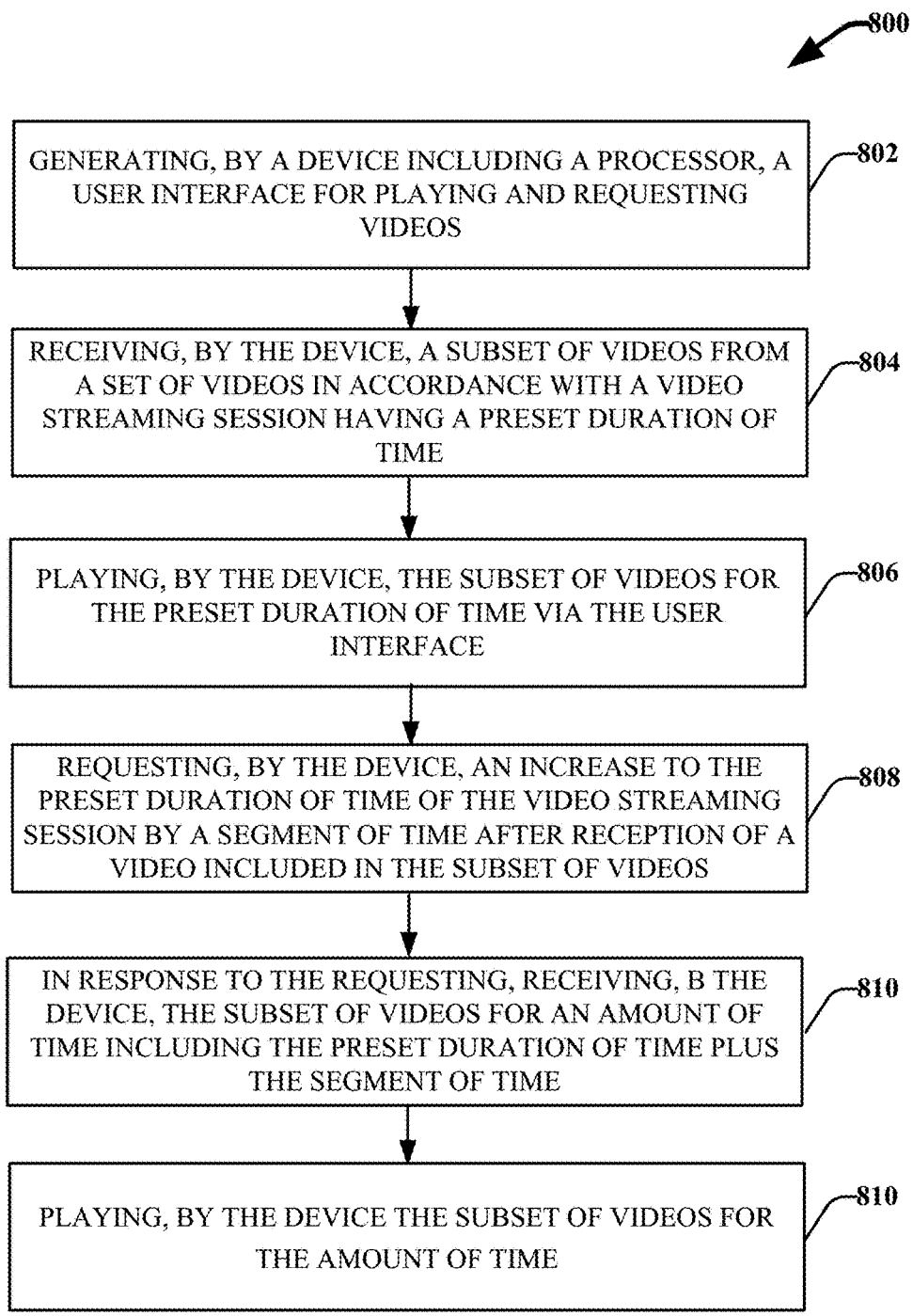
FIG. 8 is a flow diagram of an example method for extending playing time of a video playing session by adding an increment of time to the video playing session after initiation of the video playing session in accordance with various aspects and embodiments described herein.
Figure 9:
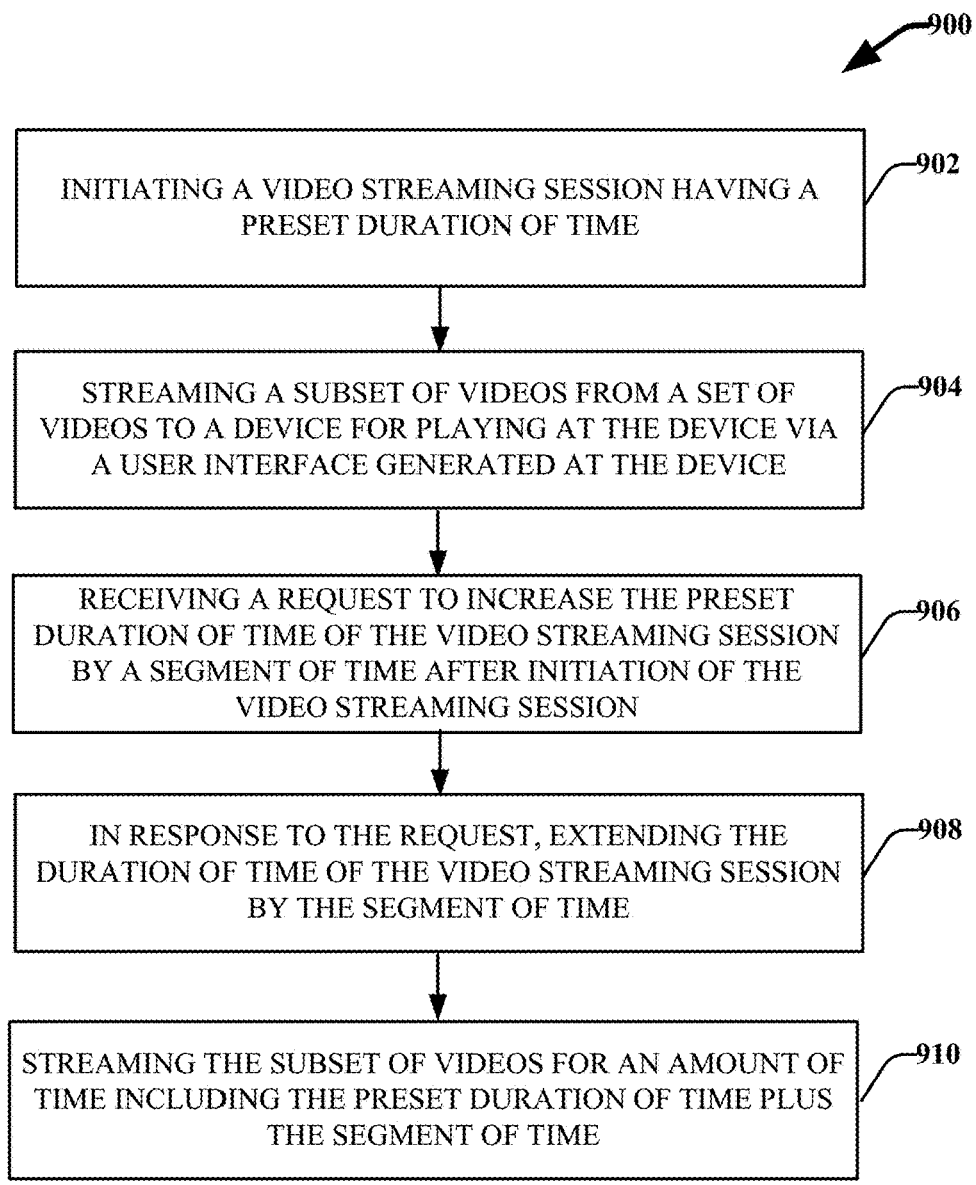
FIG. 9 is a flow diagram of another example method for extending playing time of a video playing session by adding an increment of time to the video playing session after initiation of the video playing session in accordance with various aspects and embodiments described herein.
Figure 10:
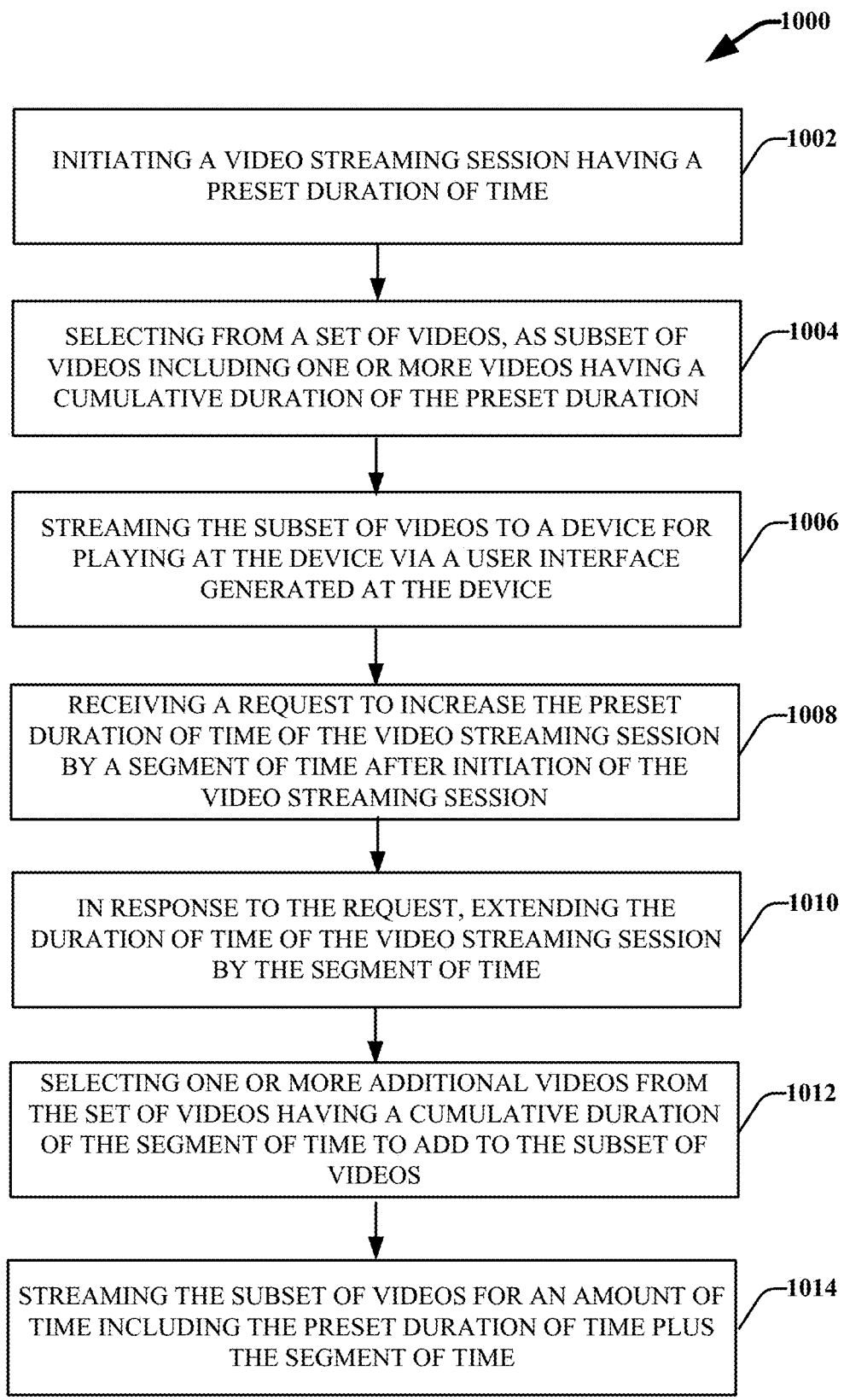
FIG. 10 is a flow diagram of another example method for extending playing time of a video playing session by adding an increment of time to the video playing session after initiation of the video playing session in accordance with various aspects and embodiments described herein.

In view of the example systems and/or devices described herein, example methods that can be implemented in accordance with the disclosed subject matter can be further appreciated with reference to flowcharts in FIGS. 8-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example method 800 for extending playing time of a video playing session by adding an increment of time to the video playing session after initiation of the video playing session in accordance with various aspects and embodiments described herein. At 802, a user interface for playing and requesting videos is generated (e.g., using interface component 404) by a device including a processor (e.g., client device 402). At 804, a subset of videos from a set of videos is received by the device including a processor in accordance with a video streaming session having a preset duration of time (e.g., via reception component 306). At 806, the device plays the subset of videos for the preset duration of time via the user interface (e.g., using presentation component 304). At 808, a request is sent by the device to increase the preset duration of time of the video streaming session by a segment of time after reception of a video included in the subset of videos (e.g., using request component 308). Then at 810, in response to the request, the subset of videos are received by the device for an amount of time including the preset duration of time plus the segment of time and at 812, the subset of videos are played by the device for the amount of time.

FIG. 9 illustrates a flow chart of another example method 900 for extending playing time of a video playing session by adding an increment of time to the video playing session after initiation of the video playing session in accordance with various aspects and embodiments described herein. At 902 a video streaming session having a preset duration of time is initiated (e.g., via media streaming session platform 318). At 904, a subset of videos from a set of videos is streamed to a device for playing at the device via a user interface generated at the device (e.g., via media streaming component 320). At 906, a request to increase the preset duration of time of the video streaming session by a segment of time after initiation of the video streaming session is received (e.g., via media streaming session control component 322). At 908 in response to the request, the duration of time of the video streaming session is extended by the segment of time (e.g., via media streaming session control component 322). At 910, the subset of videos is streamed to the device for playing at the device for an amount of time including the preset duration of time plus the segment of time (e.g., using media streaming component 320).

FIG. 10 illustrates a flow chart of another example method 1000 for extending playing time of a video playing session by adding an increment of time to the video playing session after initiation of the video playing session in accordance with various aspects and embodiments described herein. At 1002 a video streaming session having a preset duration of time is initiated (e.g., via media streaming session platform 318). At 1004, a subset of videos is selected from a set of videos for streaming to a device in accordance with the video streaming session (e.g., using selection component 708). At 1006, the subset of videos is streamed to the device for playing at the device via a user interface generated at the device (e.g., via media streaming component 320). At 1008, a request to increase the preset duration of time of the video streaming session by a segment of time after initiation of the video streaming session is received (e.g., via media streaming session control component 322). At 1010 in response to the request, the duration of time of the video streaming session is extended by the segment of time (e.g., via media streaming session control component 322). At 1012, one or more additional videos from the set of videos are selected and added to the subset of videos (e.g., using selection component 708). The one or more additional videos are selected to have a cumulative duration of the segment of time. Then at 1014, the subset of videos is streamed to the device for playing at the device for an amount of time including the preset duration of time plus the segment of time (e.g., using media streaming component 320).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 11:
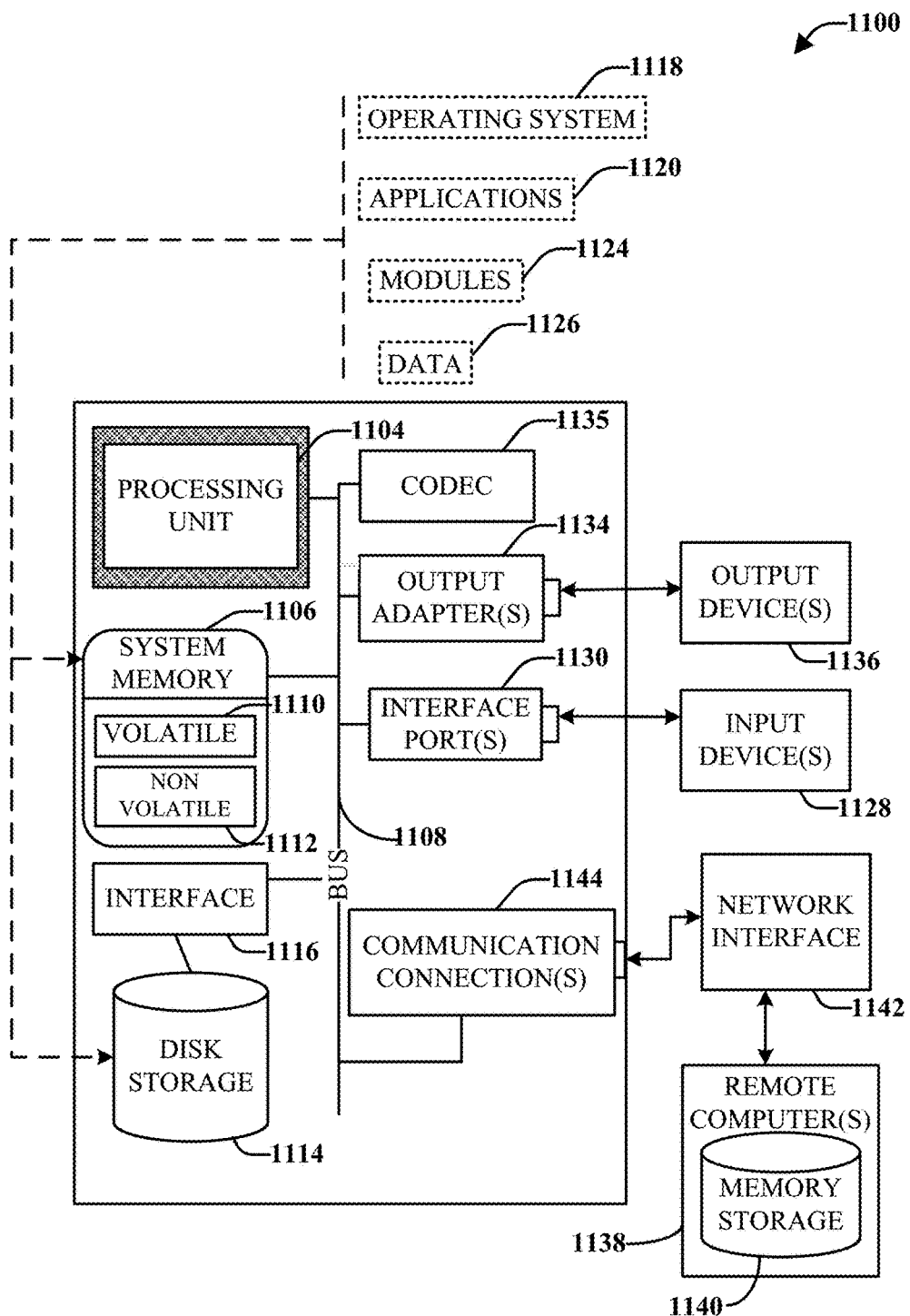
FIG. 11 is a schematic block diagram illustrating a suitable operating environment in accordance with various aspects and embodiments.
Figure 12:
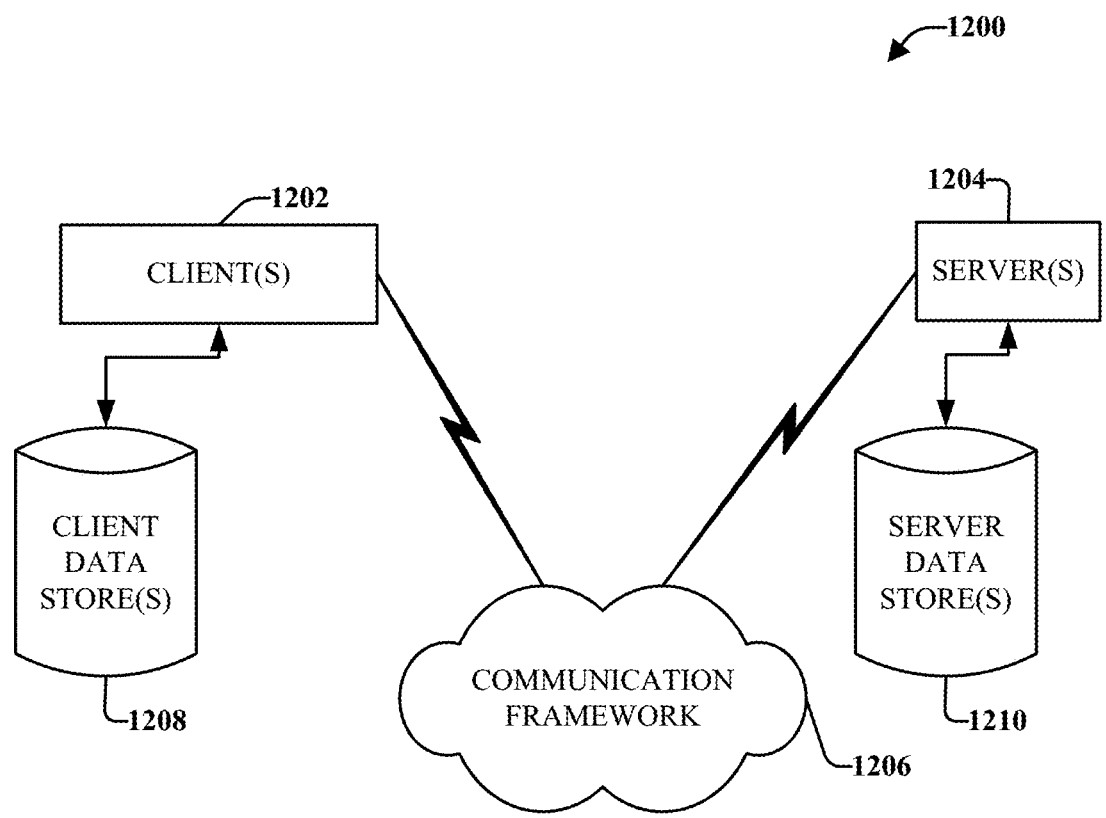
FIG. 12 is a schematic block diagram of a sample-computing environment in accordance with various aspects and embodiments.

With reference to FIG. 11, a suitable environment 1100 for implementing various aspects of the claimed subject matter includes a computer 1102. The computer 1102 includes a processing unit 1104, a system memory 1106, a codec 1105, and a system bus 1108. The system bus 1108 couples system components including, but not limited to, the system memory 1106 to the processing unit 1104. The processing unit 1104 can be any of various available processors. Dual microprocessors and other multiprocessor architectures also can be employed as the processing unit 1104.

The system bus 1108 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13114), and Small Computer Systems Interface (SCSI).

The system memory 1106 includes volatile memory 1110 and non-volatile memory 1112. The basic input/output system (BIOS), containing the basic routines to transfer information between elements within the computer 1102, such as during start-up, is stored in non-volatile memory 1112. In addition, according to present innovations, codec 1105 may include at least one of an encoder or decoder, wherein the at least one of an encoder or decoder may consist of hardware, a combination of hardware and software, or software. Although, codec 1105 is depicted as a separate component, codec 1105 may be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), or flash memory. Volatile memory 1110 includes random access memory (RAM), which acts as external cache memory. According to present aspects, the volatile memory may store the write operation retry logic (not shown in FIG. 11) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1102 may also include removable/non-removable, volatile/non-volatile computer storage medium. FIG. 11 illustrates, for example, disk storage 1114. Disk storage 1114 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1114 to the system bus 1108, a removable or non-removable interface is typically used, such as interface 1116.

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer system 1102. Applications 1120 take advantage of the management of resources by operating system 1118 through program modules 1124, and program data 1126, such as the boot/shutdown transaction table and the like, stored either in system memory 1106 or on disk storage 1114. It is to be appreciated that the claimed subject matter can be implemented with various operating systems or combinations of operating systems.

A user enters commands or information into the computer 1102 through input device(s) 1128. Input devices 1128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s). Thus, for example, a USB port may be used to provide input to computer 1102, and to output information from computer 1102 to an output device 1136. Output adapter 1134 is provided to illustrate that there are some output devices 1136 like monitors, speakers, and printers, among other output devices 1136, which require special adapters. The output adapters 1134 include, by way of illustration and not limitation, video and sound cards that provide a means of connection between the output device 1136 and the system bus 1108. It should be noted that other devices and/or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1144 refers to the hardware/software employed to connect the network interface 1142 to the bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

Referring now to FIG. 10, there is illustrated a schematic block diagram of a computing environment 1000 in accordance with this disclosure. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a metadata, e.g., associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 include or are operatively connected to one or more client data store(s) 1008 that can be employed to store information local to the client(s) 1002 (e.g., associated contextual information). Similarly, the server(s) 1004 are operatively include or are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A method comprising:
   generating, by a device comprising a processor, a user interface for playing and requesting playback of one or more videos;
   initiating a video streaming session having a duration of time in which the one or more videos are presented for the duration of time via the user interface;
   requesting a modification to increase the duration of time of the video streaming session; and
   adding at least one additional video to the one or more videos for playing back in the video streaming session, wherein the at least one additional video is selected based on the modification to increase the duration of time of the video streaming session.

2. The method of claim 1, wherein the one or more videos includes a plurality of sequential videos having varying durations of time.

3. The method of claim 1, wherein the modification to the duration of time of the video streaming session is received prior to the duration of time elapsing.

4. The method of claim 1, wherein the user interface includes an input interface that, upon selection, modifies the duration of time of the video streaming session by a defined segment of time.

5. The method of claim 4, wherein the defined segment of time is equal to an initial amount of time associated with the video streaming session.

6. The method of claim 4, wherein the defined segment of time is equal to a multiple of an initial amount of time associated with the video streaming session.

7. A system comprising:
a hardware processor that is configured to:
generate a user interface for playing and requesting playback of one or more videos;
initiate a video streaming session having a duration of time in which the one or more videos are presented for the duration of time via the user interface;
request a modification to increase the duration of time of the video streaming session; and
add at least one additional video to the one or more videos for playing back in the video streaming session, wherein the at least one additional video is selected based on the modification to increase the duration of time of the video streaming session.

8. The system of claim 7, wherein the subset of videos includes a plurality of sequential videos having varying durations of time.

9. The system of claim 7, wherein the modification to the duration of time of the video streaming session is received prior to the duration of time elapsing.

10. The system of claim 7, wherein the user interface includes an input interface that, upon selection, modifies the duration of time of the video streaming session by a defined segment of time.

11. The system of claim 10, wherein the defined segment of time is equal to an initial amount of time associated with the video streaming session.

12. The system of claim 10, wherein the defined segment of time is equal to a multiple of an initial amount of time associated with the video streaming session.

13. A non-transitory computer-readable medium having instructions stored thereon that, in response to execution, cause a system comprising a processor to perform operations, comprising:
generating, by a device comprising a processor, a user interface for playing and requesting playback of one or more videos;
initiating a video streaming session having a duration of time in which the one or more videos are presented for the duration of time via the user interface;
requesting a modification to increase the duration of time of the video streaming session; and
adding at least one additional video to the one or more videos for playing back in the video streaming session, wherein the at least one additional video is selected based on the modification to increase the duration of time of the video streaming session.

14. The non-transitory computer-readable medium of claim 13, wherein the subset of videos includes a plurality of sequential videos having varying durations of time.

15. The non-transitory computer-readable medium of claim 13, wherein the modification to the duration of time of the video streaming session is received prior to the duration of time elapsing.

16. The non-transitory computer-readable medium of claim 13, wherein the user interface includes an input interface that, upon selection, modifies the duration of time of the video streaming session by a defined segment of time.

17. The non-transitory computer-readable medium of claim 16, wherein the defined segment of time is equal to an initial amount of time associated with the video streaming session.

18. The non-transitory computer-readable medium of claim 16, wherein the defined segment of time is equal to a multiple of an initial amount of time associated with the video streaming session.

* * * * *